Patented Feb. 21, 1928.

1,660,005

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing.      Application filed July 11, 1927.   Serial No. 205,049.

This invention relates to the treatment of emulsions of mineral oil and water, such as petroleum emulsions, for the purpose of separating the oil from the water.

Petroleum emulsions are of the water-in-oil type and comprise fine droplets of naturally occurring waters or brines, dispersed in a more or less permanent state throughout the oil which constitutes the continuous phase of the emulsion. They are obtained from producing wells and from the bottoms of oil storage tanks and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting petroleum emulsion to the action of a treating agent or demulsifying agent containing a petroleum body and a fatty body chemically combined, the action of said agent on the emulsion causing the emulsion to break down and separate into its component parts of oil and water or brine, when the emulsion is permitted to remain in a quiescent state after treatment.

The demulsifying agent contemplated by my process is produced by uniting a fatty body, such as a fatty glyceride or a fatty acid with a petroleum body, such as an unsaturated naphthene or a naphthenic acid or a sulphonated petroleum acid. Said fatty bodies and petroleum bodies are characterized by having an acid value, due to the acid hydrogen of the carboxyl or of the sulphonic group, or else they are characterized by having an acetyl value, due to an alcoholiform hydroxy group, or an iodine value or bromine value, due to an unsaturated bond or its equivalent. For sake of brevity I have used the expression "reactive petroleum bodies" in the claims to mean petroleum bodies having one or more of the above described chemical characteristics, namely, an acid hydrogen, or an alcoholiform hydroxyl, or an unsaturated bond. I have found that reaction takes place readily between the fatty groups and petroleum groups of the above characteristics provided that a sulphonic acid is present in amounts approximating 3 to 10% of the mixed masses, or even more, when the sulphonic body happens to be one of the combining constituents. Suitable sulphonic acids are aromatic acids, such as phenol sulphonic acid, or fatty sulphonic acids, such as sulpholeic acid, or sulpho-fatty aromatic acids, such as phenol stearo-sulphonic acid or petroleum sulphonic acids. The sulphonic acid compound, whether added or present as one of the combining constituents, apparently acts as a catalyst.

If either of the substances used to produce the demulsifying agent, such as suitable anhydrous, washed and purified petroleum sludge, or the fatty body, happens to have an alcoholiform hydroxyl, as in the case of hydroxy stearic acid or castor oil, then the other substance that is used, such as naphthenic acid or stearic acid, need only have an acid hydrogen. The reaction will proceed upon mixture in molecular proportions, followed by addition of the catalyst, such as phenol sulpho-stearic acid in indicated proportions, together with heating at 120° C., or higher.

The time required for the reaction is approximately 2 or 10 days, and by the end of this period it will be found that the reaction goes to substantial completion. One of the reacting bodies must be a petroleum body and the other a fatty body, and said bodies must be united in such a way as to produce what I will term a condensation product due to the fact that it represents the combination of two chemical groups to form a single larger group.

Even though the preferred reaction is one in which one substance is hydroxylated and the other acidic in nature, so that the condensation process is essentially one of esterification, yet, if one substance is unsaturated and the other has a strong acid hydrogen such as the sulphonic hydrogen of sulpholeic acid, and the two substances are heated in the presence of the catalyst, as described, then the strongly acidic substance acts essentially as sulphuric acid and saturates the unsaturated bond or its equivalent with condensation of two dissimilar molecules, thereby producing the demulsifying agent contemplated by my process.

From the foregoing it will be seen that simple analysis, namely, acid value, iodine value, and acetyl value, readily determine the desirability of a substance suitable for use in producing the demulsifying agent. In a few words then, if a petroleum body is selected that has an unsaturated bond, it can be combined with a strongly acid fatty body. If the petroleum substance is hydroxylated, it can be combined with an acidic fatty body essentially by esterification. If the petroleum body has a strongly acid group, it can combine with an unsaturated fatty acid, or if acidic at all, it can combine with an hydroxylated fatty body by esterification. These criteria of reaction apply just as readily to a fatty body. In all cases, one combining molecule must be fatty and the other derived from petroleum.

The demulsifying agent that I prefer to use in my process is the mass obtained by reaction between molecular quantities of petroleum acids derived from the refining of petroleum products and castor oil. Such condensation takes place rapidly under conditions previously described. The condensation product obtained by this or similar procedures may be oil or water-soluble. In some instances the condensation product will combine with alkalies, such as caustic soda or ammonia to give a water-soluble salt or with milk of lime to give a water-insoluble salt. In actual use, it is immaterial whether the substance employed is acid, alkaline or neutral. Furthermore, it is immaterial whether it is used as derived from the primary reaction or after suitable combination with a basic material or as a water-soluble salt. It can be used in a concentrated state or dilute state.

I believe that these substances, namely, chemical combinations of fatty and petroleum bodies, are new compositions of matter not previously known, but this present application is restricted to the use of such new compositions of matter for the dehydration of petroleum emulsions.

In practising my process a treating agent or demulsifying agent of the kind above described is brought in contact with the emulsion either by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an old storage tank. In some instances it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state at a suitable temperature so as to permit the water or brine to separate from the oil, or the treated emulsion may be acted upon by one or the other of various kinds of apparatus now used in the operation of breaking petroleum emulsions, such as homogenizers, hay tanks, gun barrels, filters, centrifuges, or electrical dehydrators.

What I claim as new and desire to secure by Letters Patent of the United States is:

1. A process for breaking a petroleum emulsion of the water-in-oil type, which consists in subjecting the emulsion to the action of a treating agent containing a reactive petroleum body and a fatty body chemically combined.

2. A process for breaking a petroleum emulsion of the water-in-oil type, which consists in subjecting the emulsion to the action of a treating agent consisting of a water-soluble substance containing a reactive petroleum body and a fatty body chemically combined.

3. A process for breaking a petroleum emulsion of the water-in-oil type, which consists in subjecting the emulsion to the action of a treating agent containing a reactive petroleum body and a castor oil group chemically combined.

4. A process for breaking a petroleum emulsion of the water-in-oil type, which consists in subjecting the emulsion to the action of a treating agent consisting of a water-soluble substance containing a reactive petroleum group and a castor oil group chemically combined.

MELVIN DE GROOTE.